(12) United States Patent
Piotrowski et al.

(10) Patent No.: US 6,526,127 B1
(45) Date of Patent: Feb. 25, 2003

(54) MESSAGE STATUS RETRIEVAL SYSTEM AND METHOD

(75) Inventors: Daniel Jozef Piotrowski, Edison, NJ (US); Maria Fatima Piotrowski, Edison, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/161,794

(22) Filed: Sep. 28, 1998

(51) Int. Cl.$^7$ .............................................. H04M 1/64
(52) U.S. Cl. .................. 379/88.22; 379/68; 379/88.12; 379/88.23
(58) Field of Search ...................... 379/67.1, 68, 69, 379/70, 77, 84, 88.09, 88.12, 88.22, 88.11, 88.23, 88.24

(56) References Cited

U.S. PATENT DOCUMENTS

| | | | | |
|---|---|---|---|---|
| 5,461,665 A | * | 10/1995 | Shur et al. ............... | 379/88.11 |
| 5,956,390 A | * | 9/1999 | McKibben et al. ...... | 379/93.07 |
| 6,137,864 A | * | 10/2000 | Yaker ....................... | 379/88.22 |
| 6,332,164 B1 | * | 12/2001 | Jain .......................... | 709/203 |
| 6,351,522 B1 | * | 2/2002 | Vitikainen ............... | 379/88.22 |

* cited by examiner

Primary Examiner—Fan Tsang
Assistant Examiner—Ovidio Escalante

(57) ABSTRACT

A messaging apparatus and method is provided to allow an originator of a message to review status information associated with a stored message that has or has not been retrieved by the recipient. This status information review capability exists for a pre-determined period of time. More particularly, the message originator supplies or is provided a message identifier for the message when it is created. Subsequently, the message originator or any caller having knowledge of the message identifier may access the status information of an associated stored message by using the message identifier.

8 Claims, 3 Drawing Sheets

MESSAGE STATUS RETRIEVAL SYSTEM AND METHOD

TECHNICAL FIELD

This invention relates to telecommunications messaging systems, such as voice messaging arrangements, and more particularly, to systems and methods that provide voice message originators with status information regarding stored messages.

BACKGROUND OF THE INVENTION

Stored program control-based message systems that generate and deliver voice messages to users are well known in the art. Examples thereof are voice-mail systems and interactive voice recognition (e.g., programmed conversation) systems. These systems are designed to deliver voice messages to a user's voice mailbox. One such voice-mail system is disclosed in U.S. Pat. No. 5,311,576, incorporated herein by reference.

Conventional electronic messaging systems may allow an originator of a message to cancel an unretrieved message. For example, a message that has been rendered inaccurate or unneeded because of changed circumstances or that has been sent to the wrong person, may be canceled (as disclosed in U.S. Pat. No. 5,481,597, incorporated herein by reference).

However, conventional electronic messaging systems do not offer the message originator the capability to modify or cancel the message once it has been retrieved by a recipient. For example, once a message has been retrieved by the recipient, the originator has no way of determining when it was retrieved unless the recipient happens to respond with a new message to the originator. In this situation, the originator is forced to leave multiple, repeat messages to the recipient, thereby causing the recipient's mailbox to approach saturation and ultimately limiting the effectiveness of the voice-mail system. Furthermore, many times it is less important for the originator to actually receive a return message response or call back from the recipient, than to have knowledge that the recipient has retrieved the message, and an indication of when the message was retrieved. For example, a message may indicate that a 2:00 P.M. doctor's appointment has been canceled. Thus, if the message has been read by 1:00 P.M., the message originator knows that the recipient is aware of the cancellation, whether or not the recipient has responded to the originator's message.

SUMMARY OF THE INVENTION

An advance is made over the art by the present invention directed to a method and apparatus that enables a message originator to receive status information regarding a message stored in a recipient's voice messaging system (VMS). In a specific illustrative embodiment, the VMS stores the originator's message in a storage medium and generates an identifier for the stored message. The VMS generates and stores status information associated with the message. The message originator can use the message identifier to gain access to the storage medium to access the status information for the message.

According to another illustrative embodiment, the message originator can provide an identifier for the message when the message is created. In still another illustrative embodiment, the originator may selectively determine the length of time the status information will be available to him or her after the recipient has retrieved the message.

When the message originator or any caller has reached the storage medium and supplied the message identifier of the stored message, that person is provided access to stored status information associated with the message. Thereafter, the caller can access or review the status information for the associated message. For example, the caller can determine whether the message has remained unretrieved since the date of delivery, has been retrieved on a given date, or has been deleted. Thus, the message originator gains the ability to review a message's status information stored in the particular mailbox, regardless of whether the message has been retrieved. In turn, the originator may take appropriate action, such as leaving another message requesting that the recipient or owner of the mailbox confirm receipt of the previous message.

BRIEF DESCRIPTION OF THE DRAWING

These and other advantages and features of the invention will become more apparent from the following detailed description of illustrative embodiments of the invention considered together with the drawing, in which.

DETAILED DESCRIPTION

Figure 1:
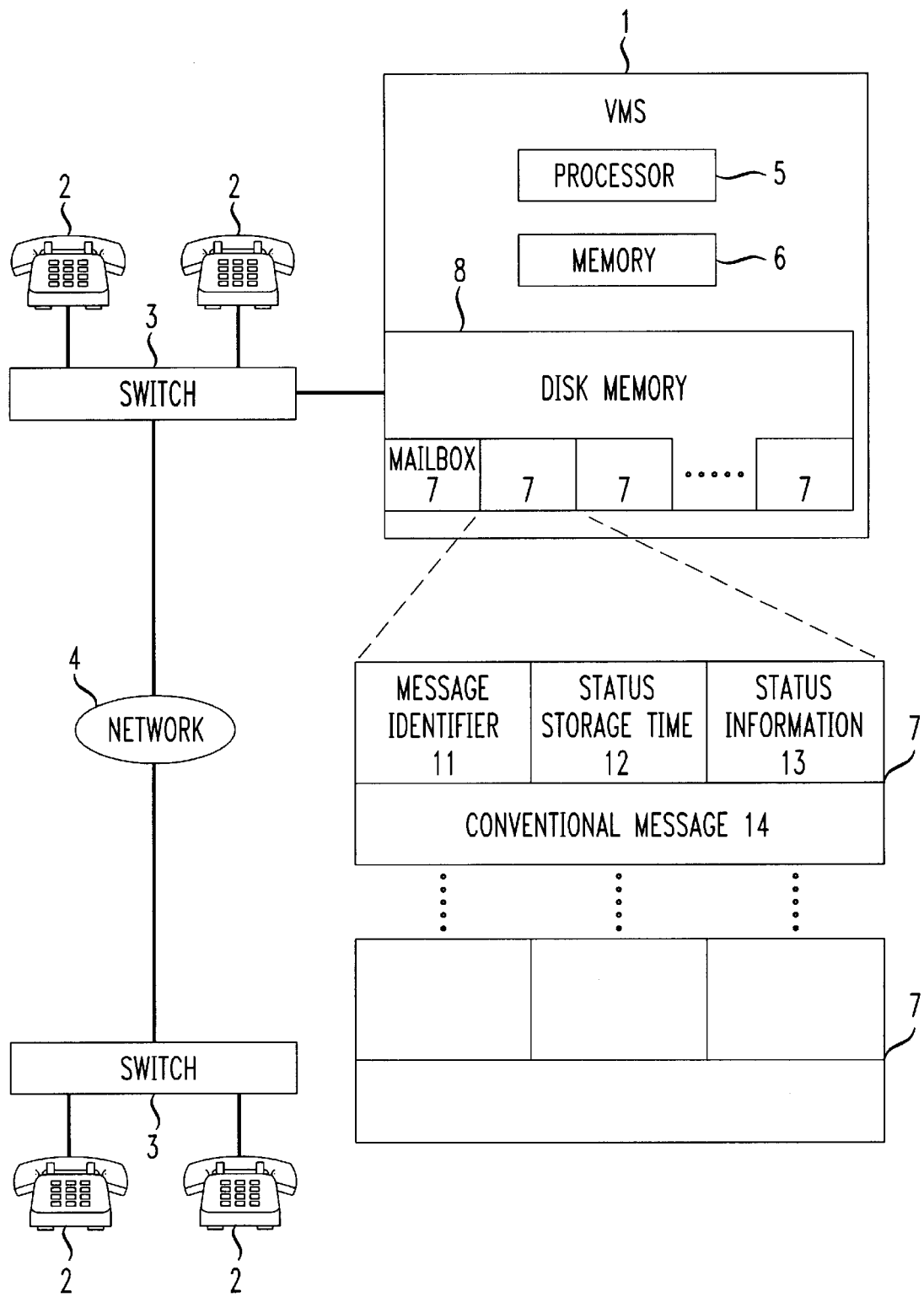
FIG. 1 is a block diagram of a messaging system according to one embodiment of the invention.

In accordance with the principles of the invention, a voice messaging system (VMS) as shown in FIG. 1 allows a message originator to review the status information of a message delivered to a particular recipient or subscriber, whether or not the recipient has retrieved the message. As used herein, a message originator or caller is a person, group of persons or other entities who may either cause to be stored, send, or forward, a message to a recipient's message storage device or access a recipient's message storage device to retrieve status information associated with a particular message. Recipient shall mean herein, for example, any subscriber or user of the message storage device.

A VMS 1 comprises, for example, one or more commercially available Lucent Technologies Audix™ Voice Message Systems. Originator terminals 2 are used to interconnect with one or more VMSs 1 via a switching system 3, such as a local telephone central office switch (for example a commercially available Lucent Technologies 5ESS™ Switch) or a private branch exchange (PBX) (for example, the commercially available Lucent Technologies Infinity® system). Switching system 3 may be interconnected to a telecommunications network 4 that optionally includes other switches interconnecting additional VMSs and originator terminals.

An exemplary VMS 1 is a processor-controlled unit operating under stored-program control. Each VMS 1 includes a processor 5 that executes programs stored in a memory 6, and a disk memory 8 that includes a plurality of subscriber mailboxes 7. Disk memory 8 of FIG. 1 also stores announcements that can be selectively retrieved and played to VMS subscribers and message originators, in a conventional manner. VMS 1 stores recipients' messages in mailboxes 7 in a conventional manner. As will be understood by those skilled in the art, mailboxes 7 can comprise any conventional database/indexing storage system which can store and allow access to message/data related to a particular user. Each mailbox 7 contains storage for a predetermined number of messages 14.

In accordance with an aspect of the invention each message 14 comprises a conventional message having additionally associated therewith a message identifier 11, status storage time 12, and status information 13. Status information 13 is stored for predetermined length of time (e.g. five days) after the recipient retrieves the message. This length of time is determined by the voice mail system, or alternatively, by the message originator. For example, if the message originator creates a message 14 on day one, with a status storage time 12 of five days, and if the recipient retrieves the message on day three, the total status information storage interval would equal eight days from the time of creation.

Figure 2:
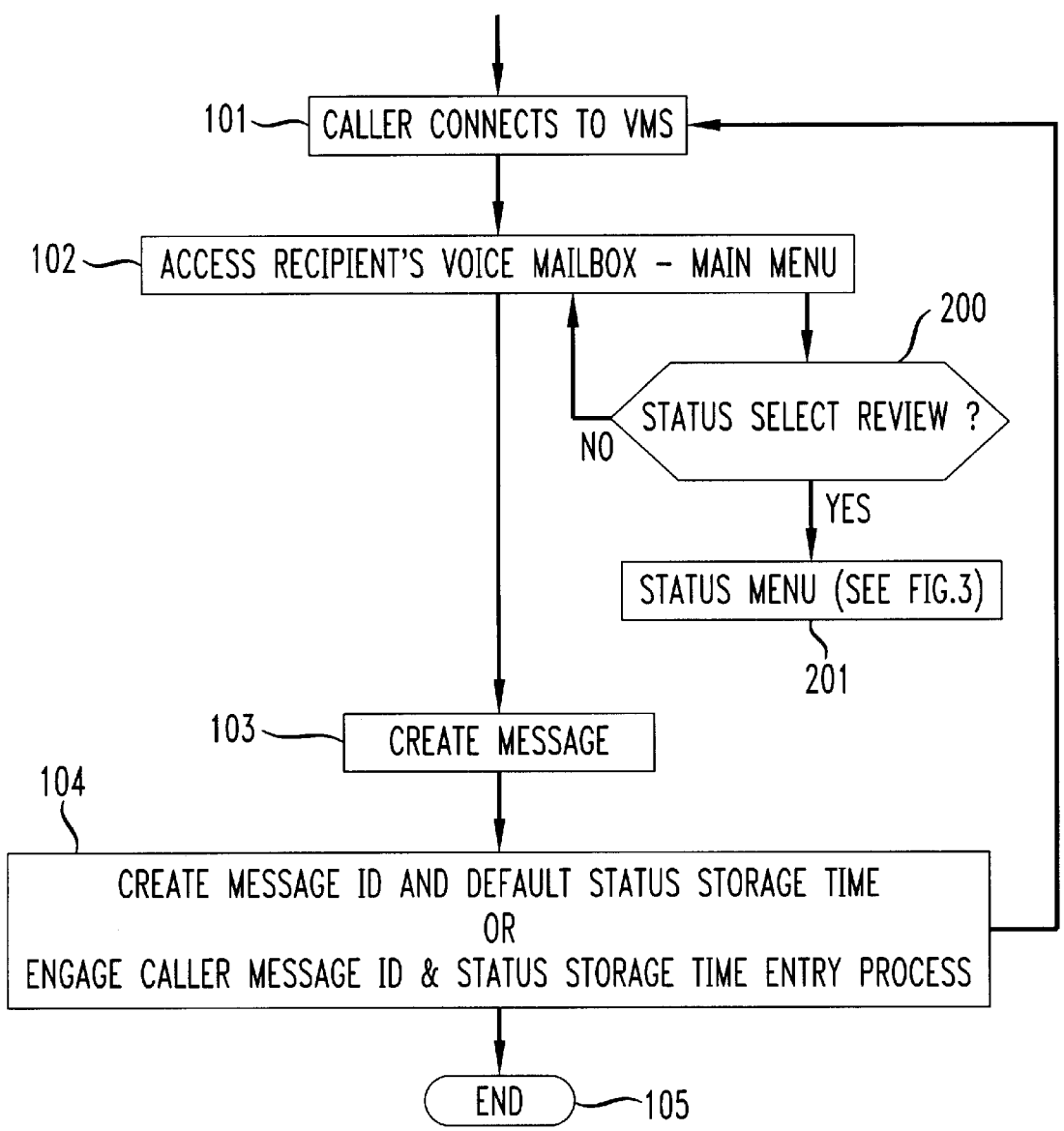
FIGS. 2 and 3 are flow diagrams of functions performed in response to an originator accessing a recipient's storage medium in the voice messaging system of FIG. 1.
Figure 3:
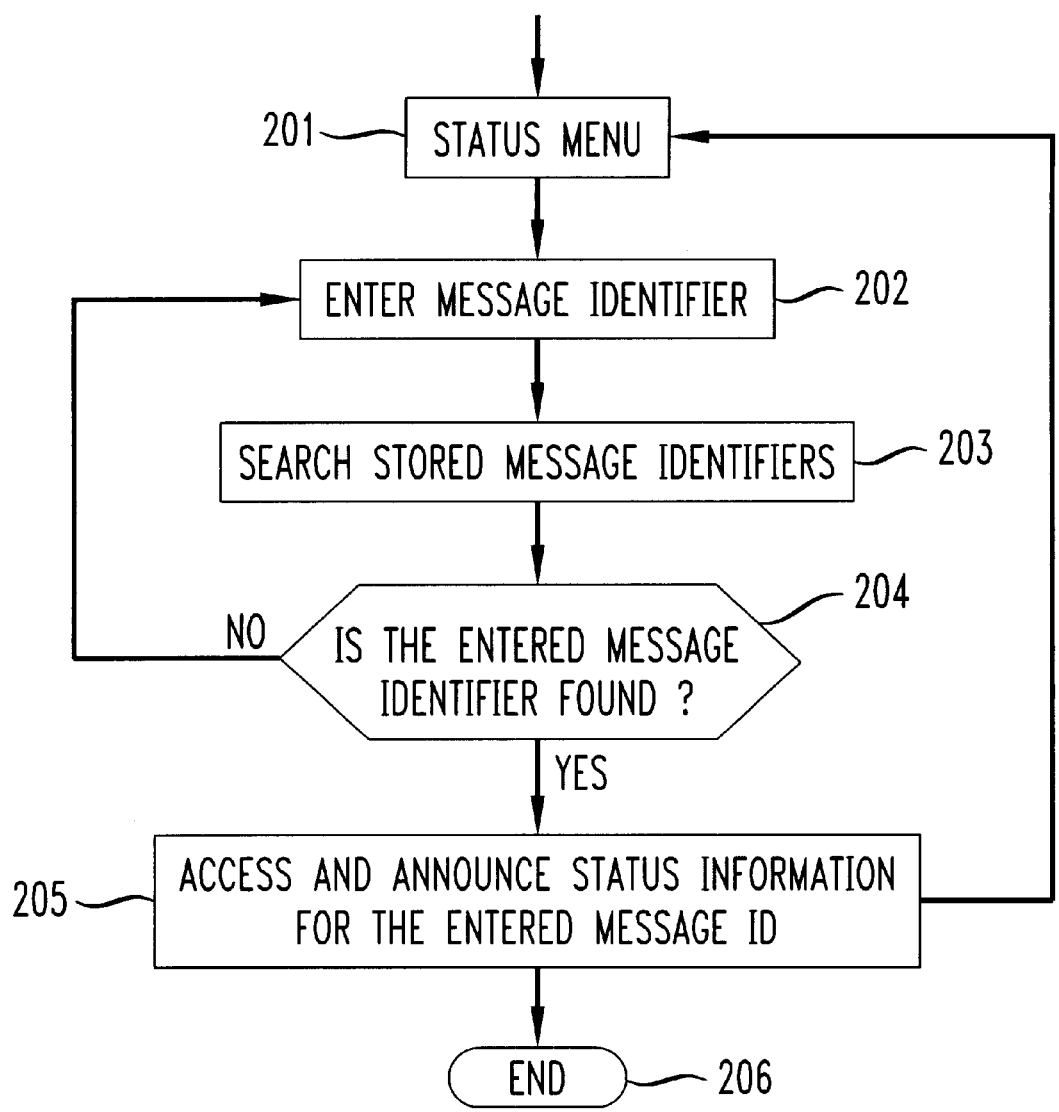

Further, VMS 1 usually includes programs in memory that are functionally described in flow diagrams depicted in FIGS. 2 and 3. Execution of these programs implements the steps necessary to enable message originators to review the status information 13 of stored messages 14.

With simultaneous reference now to FIGS. 1 and 2, there is shown in step 101 in FIG. 2 a message originator or caller connecting to a recipient's VMS 1 via the switching system 3 of FIG. 1. As noted previously, such methods are known to those skilled in the art.

In particular, in step 101, the message originator or caller is connected to the recipient's mailbox 7 in VMS 1. Based on the information provided by the caller to connect to VMS 1, a determination is made by processor 5 as to the identity of the called recipient, so that the appropriate mailbox 7 can be accessed by the message originator. In step 102, the caller accesses recipient's mailbox 7. At step 102, VMS 1 also typically announces a greeting to the caller, and guides the caller through various conventional menu options at a main menu. For example, the greeting may inform the caller of the identity of the recipient whose mailbox 7 the caller has reached. Also, upon selecting a new menu option, an explanation of the status review feature may be provided to the caller. The caller may then proceed in a conventional manner to record a message, which is created at step 103, or the caller may terminate the call at any time by hanging-up. After the conventional message is recorded, message identifier 11 is created by processor 14 at step 104, along with status storage time 12 and status information 13, which are all stored in recipient's mailbox 7. For additional messages to the same or a different recipient, this process may then be repeated by the caller by returning to step 101, or the call can be terminated as indicated by step 105.

As will be further described below, after message 14 has been retrieved or deleted by the recipient, message status information 13 associated with message 14 will continue to be stored in recipient's mailbox 7. Advantageously, a maximum status storage time 12 (for example, 15 days) can be incorporated into the VMS 1 as a default parameter. Thus, disk space can be reclaimed by the VMS.

Returning to step 104 of FIG. 2, the system may instruct the caller to enter a desired message identifier 11, and to select a desired status storage time 12. In such a case, message identifier 11 entered by the caller may be any type and length selected by the caller within system limits (for example six alpha-numeric characters). Similarly, status storage time 12 may be any length of time within system limits (for example, between one and fifteen days). Once the desired message identifier 11 and status storage time 12 are received, a verification is performed by the VMS to determine if the desired message identifier 11 value is unique, and if the desired status storage time 12 and desired message identifier 11 are acceptable values within system limitations. If these conditions are not met, the caller is prompted for new values. This process is repeated until a desired message identifier 11 and a desired status storage time 12 are confirmed by the processor 5. If, after a predetermined number of attempts (for example three attempts), the caller fails to provide an acceptable value for either the message identifier or the storage time, the system generates these values for the caller as described above. Whether selected by the system or not, these values are associated with the particular message and stored the system. An announcement is then made to convey these values to the caller.

Unlike conventional voice mail systems, the present invention retains, in memory 8, a portion of the information associated with message 14 even after message 14 has been retrieved or deleted. Specifically, message identifier 11 status storage time 12 and status storage information 13 are retained in memory 8 for the time specified by status storage time 12. This is accomplished by discarding the conventional portion of message 14 while retaining its associated information in memory. Thus, the voice mail system reclaims storage space while retaining associated information necessary for the caller to retrieve status information 13 for a particular message.

Information is generated by processor 5 and stored as part of status information 13. For example, when the message is created and stored in the mailbox, a time and date stamp could be generated and stored as the status information for that particular message. Similarly, for each specified action of the recipient, a time and date stamp is generated by the processor 5 and stored as part of status information 13 amending status information previously stored. For example, when the recipient retrieves a message, a new date stamp indicative of the time at which the message was retrieved can be generated and stored in the status information.

Thereafter, a message originator may call back and receive status information 13 regarding the message 14 at any time prior to the expiration of status storage time 12. Illustratively, this is done by using the main menu as described above with regard to step 102 of FIG. 2. The main menu contains various choices for further action. For example, the main menu at step 102 includes the conventional options for electronic messaging systems which may be used to prompt a caller for various actions such as press one to record a voice mail message, press two for an operator, and the like. As shown in step 200 in FIG. 2, in addition to these conventional option selections, the system advantageously can include an option selection such as, "press three for status review features." In step 201 of FIG. 3, selection of this option directs a caller to the status information menu. Thereafter, at step 201, the caller can select various menu options (not shown), for example, "press one to enter a message identifier to review status information;" "press two to return to the main menu;" or "press three to hang up." If the caller elects to review status information 13 of message 14, the caller enters message identifier 11, at step 202. In step 203, the processor performs a search of message identifiers 11 in recipient's storage medium 7 for received message identifier 11. If entered message identifier 11 is found, the system proceeds to step 205 to access and announce the status information to the caller. If the processor 5 does not find message identifier 11 entered by the caller, it announces a failure to the caller. The process is repeated until a successful message identifier 11 is entered, which is represented by step 204. Checks may be performed as to whether the caller has exceeded the message identifier 11 attempt limit. After the caller accesses the status information of a particular message, the process may then be repeated for a new message identifier 11, by returning to step 201. If the process is completed (e.g., the caller presses three to hang up) or if the attempt limit is exceeded, the processor 5 terminates the call at step 206.

The foregoing merely illustrates the principles and applications of the present invention. It will thus be appreciated that those skilled in the art will be able to devise numerous arrangements which, although not explicitly shown or described herein, embody those principles and are within their spirit and scope.

What is claimed is:

1. A method of operating a messaging arrangement, comprising the steps of:

storing a message from a message originator to a recipient;

generating a message identifier that is uniquely associated with said message;

storing said message identifier associated with said message;

generating status information associated with said message;

receiving an indication of the period of time for storing status information from the message originator;

storing said status information associated with said message, wherein said status information is stored for the indicated period of time after said message is retrieved or deleted by said recipient; and providing said message originator with access to status information in response to receiving said message identifier.

2. The method of claim 1, wherein the step of generating a message identifier further comprises the steps of:

receiving a proposed message identifier, examining message identifiers of currently stored identified messages in said messaging arrangement to determine whether the proposed message identifier is unique, accepting said proposed message identifier if it is unique, and generating an alternate unique message identifier if said proposed message identifier is not unique.

3. A messaging apparatus comprising:

means for storing a message from a message originator to a recipient;

means for generating a message identifier associated with said message and storing said message identifier in said storing means;

means for generating status information associated with said message and storing said status information in said storing means;

means for receiving an indication of the period of time for storing status information from the message originator, wherein said status information stored in said storing means is stored for the indicated period of time after said message is retrieved or deleted by said recipient; and means, responsive to said message identifier associated with the message stored in said storing means, for providing access to status information associated with the message.

4. The apparatus of claim 3, wherein the storing means is a voice messaging system mailbox.

5. The apparatus of claim 3, wherein the means for generating a message identifier further comprises:

means for receiving a proposed message identifier from a message originator;

means for examining currently stored message identifiers in said storing means of a recipient to determine whether said received message identifier is unique; and means responsive to a determination that the received message identifier is not unique, for generating an alternate unique message identifier.

6. The apparatus of claim 3, wherein status information stored in said storage means further comprises information specifying the period of time for storing status information after said recipient retrieves or deletes said message from the message originator.

7. A messaging apparatus comprising:

a memory for storing a message from a message originator;

a processor for generating a message identifier and status information associated with said message, for storing said message identifier and said status information in said memory, and for providing said originator with said message identifier;

said processor operable for receiving an indication of the period of time for storing status information from the message originator, wherein the status information is stored in said memory for the indicated period of time after a recipient retrieves or deletes said message; and said processor being responsive to said originator supplying the message identifier of said message stored in said storing means, and thereby providing said originator with access to the status information stored in said storing means that is associated with said message identifier.

8. The apparatus of claim 7 wherein the memory is a voice messaging system mailbox.

* * * * *